(12) United States Patent
Oster

(10) Patent No.: US 10,527,137 B2
(45) Date of Patent: Jan. 7, 2020

(54) SPINDLE DRIVE APPARATUS

(71) Applicant: Stabilus GmbH, Koblenz (DE)

(72) Inventor: Peter Oster, Koblenz (DE)

(73) Assignee: Stabilus GmbH, Koblenz (DE)

( * ) Notice: Subject to any disclaimer, the term of this patent is extended or adjusted under 35 U.S.C. 154(b) by 219 days.

(21) Appl. No.: 15/709,888

(22) Filed: Sep. 20, 2017

(65) Prior Publication Data
US 2018/0080532 A1    Mar. 22, 2018

(30) Foreign Application Priority Data

Sep. 22, 2016   (DE) .................... 10 2016 218 225

(51) Int. Cl.
| | | |
|---|---|---|
| *F16H 19/00* | (2006.01) | |
| *F16H 25/20* | (2006.01) | |
| *E05F 15/622* | (2015.01) | |
| *E05F 1/10* | (2006.01) | |
| *F16H 25/04* | (2006.01) | |

(52) U.S. Cl.
CPC ......... *F16H 19/001* (2013.01); *E05F 1/1058* (2013.01); *E05F 15/622* (2015.01); *F16H 25/04* (2013.01); *F16H 25/20* (2013.01); *E05Y 2900/531* (2013.01); *E05Y 2900/546* (2013.01); *F16H 2025/204* (2013.01);
(Continued)

(58) Field of Classification Search
CPC ........ F16H 19/001; F16H 25/04; F16H 25/20; E05F 15/622; E05F 1/1058
See application file for complete search history.

(56) References Cited

U.S. PATENT DOCUMENTS 7,566,092 B2 *   7/2009   Paton ..................... B60J 5/101
                                                                296/106
7,648,189 B2 *   1/2010   Porat ..................... E05F 1/1091
                                                              296/146.4

(Continued)

FOREIGN PATENT DOCUMENTS

DE        202004002254        4/2004
DE        10 2004 040170      3/2006
(Continued)

OTHER PUBLICATIONS

Extended European Search Report for European application No. 17 192 076.2, dated Feb. 14, 2018 ; 7 pages.

(Continued)

*Primary Examiner* — David M Fenstermacher
(74) *Attorney, Agent, or Firm* — Rankin, Hill & Clark LLP

(57) ABSTRACT

A spindle drive apparatus includes a guide tube having a connection unit for connecting the spindle drive apparatus to a superordinate assembly, the connection unit fastened to the guide tube for rotation relative thereto, an externally threaded spindle housed at least in part in the guide tube, a further connection unit rotationally fixed to the end of the spindle for connecting the spindle drive apparatus to a further superordinate assembly, a spindle nut is fastened to the guide tube in threaded engagement with the spindle, and a drive assembly has a drive unit, wherein a drive element that is driven by the drive unit surrounds the guide tube and is rotationally fixable thereto, and wherein the drive unit is supported on one of the superordinate assemblies or on an element connected thereto.

10 Claims, 5 Drawing Sheets

(52) U.S. Cl.
CPC ............... *F16H 2025/209* (2013.01); *F16H 2025/2037* (2013.01); *F16H 2025/2084* (2013.01)

(56) References Cited

U.S. PATENT DOCUMENTS

| | | | |
|---|---|---|---|
| 9,776,483 B2* | 10/2017 | Shchokin | B60J 5/107 |
| 2004/0084265 A1 | 5/2004 | Muller et al. | |
| 2008/0060273 A1* | 3/2008 | Bochen | H02K 7/06 |
| | | | 49/340 |
| 2008/0250720 A1* | 10/2008 | Oxley | E05F 15/622 |
| | | | 49/358 |
| 2009/0113803 A1 | 5/2009 | Arenz | |
| 2012/0098368 A1* | 4/2012 | Xiong | H02K 7/06 |
| | | | 310/77 |
| 2014/0173988 A1* | 6/2014 | Bochen | B60J 5/102 |
| | | | 49/340 |

FOREIGN PATENT DOCUMENTS

| | | |
|---|---|---|
| DE | 10 2007 037128 | 2/2009 |
| DE | 102012211062 | 1/2014 |
| DE | 10 2013 003830 | 9/2014 |
| WO | 2012063226 | 5/2012 |
| WO | 2015061885 | 5/2015 |

OTHER PUBLICATIONS

Search Report of DE 10 2016 218 225.0 dated Jun. 8, 2017, 7 pages.

* cited by examiner

SPINDLE DRIVE APPARATUS

BACKGROUND

The invention relates to a spindle drive apparatus, as is used for example to open and close doors and/or tailgates of motor vehicles.

The spindle drive apparatuses that are generally known on the market are disadvantageous in that they are expensive to produce owing to the high number of components of which they are composed. Furthermore, owing to the design of these spindle drive apparatuses, a large amount of installation space has to be available in order for them to be used.

BRIEF DESCRIPTION

The object of the present invention is therefore to remedy these drawbacks.

This object is achieved according to the invention by a spindle drive apparatus comprising a guide tube having a longitudinal axis, wherein the guide tube is provided, on one end thereof, with a connection unit for connecting the spindle drive apparatus to a superordinate assembly, i.e. an assembly that is not part of the spindle drive apparatus, and wherein the connection unit is fastened to the guide tube such that it can rotate relative thereto about the longitudinal axis; a spindle, which is provided with an external thread, is housed at least in part in the guide tube, and protrudes out of the guide tube at the other end thereof in each case, wherein a further connection unit is rotationally fixed to the end of the spindle that protrudes out of the guide tube, which further connection unit is intended for connecting the spindle drive apparatus to a further superordinate assembly, i.e. an assembly that is not part of the spindle drive apparatus; a spindle nut that is fastened to the guide tube and is in threaded engagement with the external thread of the spindle; and a drive assembly comprising a drive unit, wherein a drive element that is driven by the drive unit surrounds the guide tube and can be rotationally fixed thereto, and wherein the drive unit is supported on one of the superordinate assemblies or on an element connected thereto.

Owing to this design, the spindle drive apparatus according to the invention does not have to comprise a housing tube. Furthermore, the drive unit, which may be formed by an electric motor for example, does not have to be arranged in the extension of the guide tube along the longitudinal axis, but can instead always be arranged wherever there is installation space available therefore. In particular, the drive element can be rotationally fixed to the guide tube at any suitable position along said guide tube.

The drive element and the guide tube may be rotationally fixed to one another by means of an interference fit, for example. Additionally or alternatively, the guide tube may comprise, on the outside thereof, at least one groove extending in the axial direction.

So as to be able to at least partially compensate for the torque exerted on the spindle drive apparatus by the door and/or tailgate of the motor vehicle, it is proposed that the spindle drive apparatus can also comprise a preloaded helical spring which surrounds the guide tube and the spindle over at least a portion of the length thereof in each case. The helical spring can be connected, by means of a first mount, to the guide tube for operation therewith in both the axial direction and the circumferential direction, whereas said helical spring can be connectable, by means of a second mount, to the spindle for operation therewith in the axial direction, but such that it can rotate relative thereto in the circumferential direction. For example, the two mounts can be in threaded engagement with the helical spring. In this case, the direction of rotation of the helical spring can be selected such that the threaded engagement still exists even when the guide tube and the helical spring rotate together. For example, the helical spring can be designed as a helical extension spring.

In principle, however, it is also conceivable to dispense with a helical spring of this kind that surrounds the guide tube. Alternatively, the helical spring could also be provided independently of the spindle drive apparatus. Furthermore, additionally or alternatively, at least one gas spring and/or at least one leg spring or the like could also be provided so as to compensate for the torque.

The helical spring surrounding the guide tube can also contribute to the protection of the spindle, in particular to the protection of the thread of the spindle, from external influences and inadvertent damage, since said helical spring surrounds the spindle together with the guide tube over the entire length thereof.

In this connection, the first mount can also engage in the above-mentioned groove, for example, in order to ensure that said mount is rotationally fixed to the guide tube. Moving the mount in the groove can however also be used to modify the preloading of the helical spring. By means of a grub screw or another suitable means, the mount can then be fixed relative to the guide tube in the axial direction.

The drive unit can be arranged for example such that an output shaft of the drive unit extends substantially in parallel with the spindle. Owing to this arrangement, the overall length of the spindle drive apparatus according to the invention can be reduced in comparison with conventional spindle drive apparatuses in which the drive unit is arranged in the extension of the guide tube along the longitudinal axis thereof. The output shaft of the drive unit can be connected to the drive element surrounding the guide tube for example by means of a pinion which meshes with external teeth on the drive element, or by means of a belt, for example a toothed belt.

So as to be able to also adapt to situations involving other installation space conditions, it is however also conceivable for an output shaft of the drive unit to extend substantially orthogonally to the spindle. Installation space conditions under which this variant can be advantageously used are found in tailgates of motor vehicles, for example. In tailgates, the drive unit can advantageously be arranged substantially in parallel with the pivot axis of the tailgate.

In order to connect the output shaft of the drive unit to the drive element, it can be provided in this case that the output shaft of the drive unit supports a worm wheel which meshes with external teeth on the drive element connected to the guide tube. The worm wheel stage formed thereby for reducing the rotational speed of the output shaft of the drive unit is characterised by low noise emission.

In order to be able to arrange the spindle drive apparatus on either the right-hand side or the left-hand side of the tailgate as required, without having to provide two separate types of spindle drive apparatus for this purpose, namely a "left-hand" and a "right-hand" spindle drive apparatus, it can advantageously be provided that the drive assembly can be connected to the guide tube in two positions in which it is rotated by 180° relative to an axis that extends orthogonally to the longitudinal axis. In this way, the drive assembly only needs to be connected to the guide tube in the corresponding orientation in order to obtain a "left-hand" or a "right-hand" spindle drive apparatus. However, this variant can also be advantageously used in embodiments in which the output shaft of the drive unit is oriented in parallel with the longitudinal axis of the guide tube.

In a development of the invention, it is proposed that the drive assembly comprises a housing in which the drive unit and the drive element are housed. By means of this housing, the drive assembly can also be supported on one of the superordinate assemblies or on the element connected thereto. The housing can advantageously have two housing parts which are preferably asymmetric to one another. In this way, the housing comprises a main housing part in which the majority of the components of the drive assembly, preferably all the components of the drive assembly, are arranged, and a housing lid part of which the function is substantially to cover a mounting opening in the main housing part, which opening provides an access point to the interior space of the housing for mounting purposes.

Irrespective of whether the output shaft of the drive unit is arranged so as to be substantially parallel or substantially orthogonal to the longitudinal axis of the guide tube, the drive unit can be arranged in any circumferential position in relation to the guide tube.

In order for it to be possible for the spindle to be guided in the guide tube in an improved manner, in a development of the invention, it is also proposed that a guide unit is arranged on the end of the spindle that is housed in the guide tube, which guide unit is slidably engaged with the interior wall of the guide tube.

In another variant, which makes it easier to assemble the components of the drive apparatus according to the invention, the guide tube can be composed of two half shells.

It should also be noted that the spindle can preferably be made of steel, whereas the guide tube can be made of metal for example, but also plastics material. The spindle nut, the guide unit and the two mounts for the helical spring can also be made of plastics material. Furthermore, the drive element can be made of plastics material, whereas the worm wheel can be made of plastics material or metal. The housing in which the drive unit and the drive element are housed can also be made of plastics material. Finally, the connection units and the torque support can be made of plastics material and/or metal.

BRIEF DESCRIPTION OF THE DRAWINGS

The invention is explained in more detail in the following with reference to the accompanying drawings of an embodiment, in which:

In FIGS. 1 and 2, an embodiment of a spindle drive apparatus according to the invention is denoted in general by reference numeral 10.

DETAILED DESCRIPTION

Figure 1:
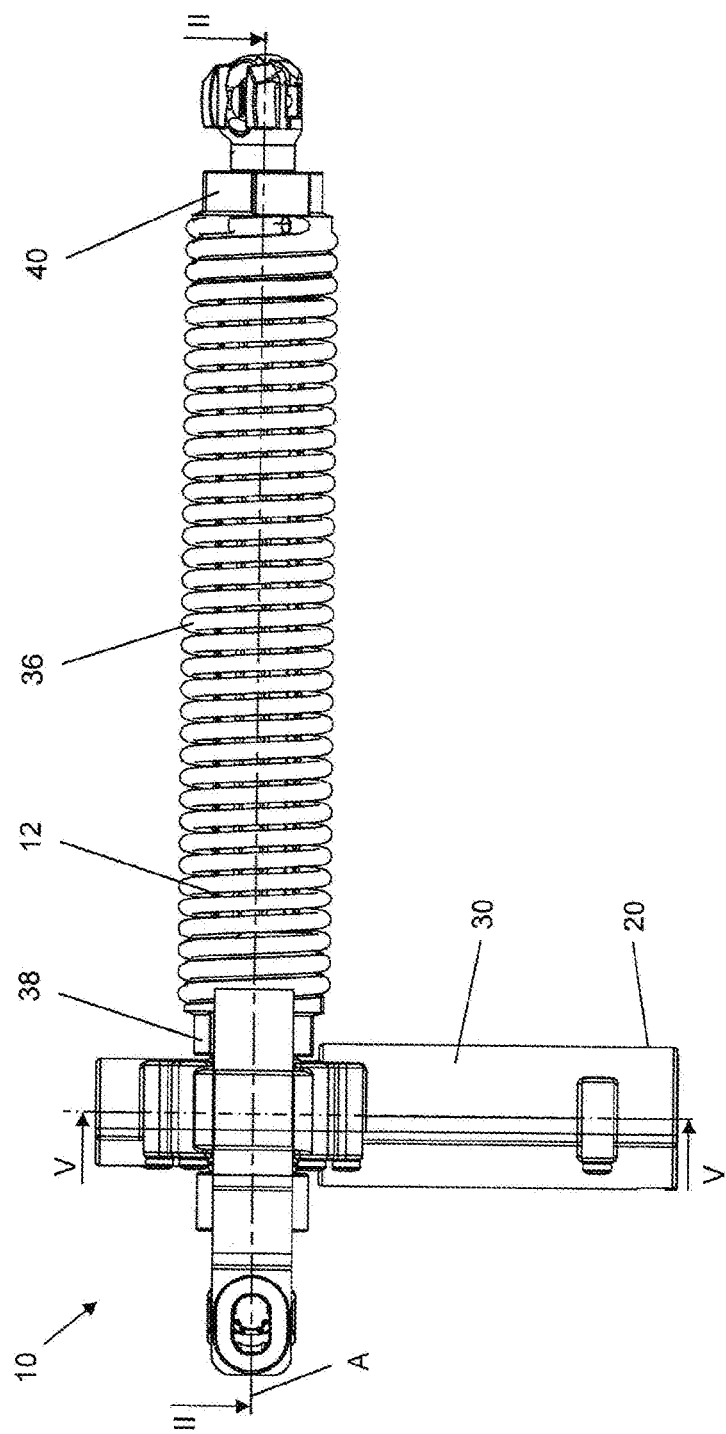
FIG. 1 is a side view of an embodiment of a spindle drive apparatus according to the invention.

The spindle drive apparatus 10 comprises a guide tube 12 having a longitudinal axis A, which, in this embodiment, coincides with a central axis of the guide tube 12. A spindle 16 (see also FIGS. 3 and 4) provided with an external thread 14 is housed at least in part in the guide tube 12, which spindle protrudes out of the guide tube 12 at one end thereof. Furthermore, the spindle drive apparatus 10 comprises a spindle nut 18 that is fastened to the guide tube 12 and is in threaded engagement with the external thread 14 of the spindle 16, and a drive assembly 20 comprising a drive unit 22, which is designed as an electric motor 22 in this case (see FIG. 5).

Figure 5:
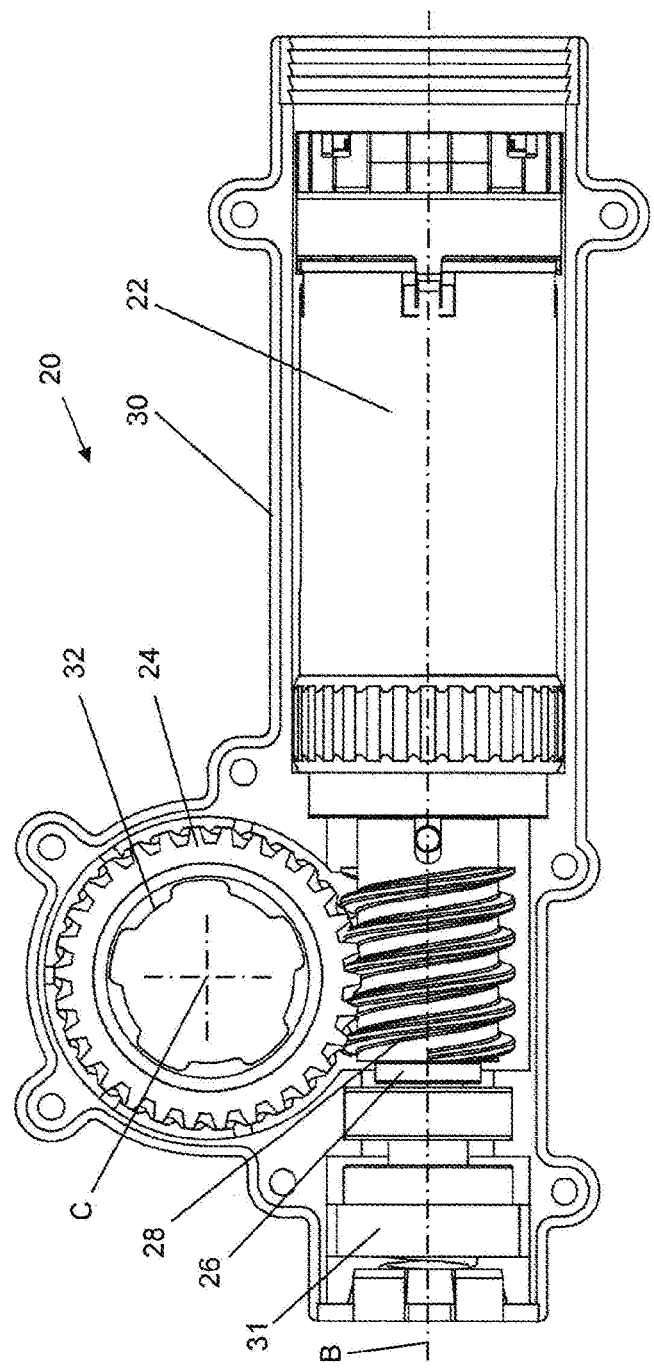
FIG. 5 is a cross-sectional view along the sectional plane V-V shown in FIG. 1, rotated 90° in the anti-clockwise direction.

With reference to FIG. 5, a drive element 24 that is driven by the electric motor 22 surrounds the guide tube 12 and can be rotationally fixed thereto, it being possible to move the drive element 24 and thus the drive assembly 20 along the guide tube 12.

The electric motor 22 comprises an output shaft 26 on which a worm wheel 28 is in turn arranged. The output shaft 26 is in this case rotatably mounted in a housing 30 of the drive assembly 20 on the end thereof that is opposite the electric motor 22. The worm wheel 28 is in threaded engagement with the drive element 24 such that if the worm wheel 28 rotates about a rotational axis B, this causes the drive element 24 to rotate about a rotational axis C. In this case, the rotational axis B and the rotational axis C are arranged such that they are substantially orthogonal and skewed in relation to one another.

A brake 31 can also be seen on the left-hand side of FIG. 5, which brake ensures that, after the electric motor 22 has been turned off, the door or tailgate of the motor vehicle remains in the position in which it is located at the point at which the electric motor 22 is switched off. The brake 31 therefore prevents the door or tailgate of the motor vehicle from automatically shutting again in an undesired manner.

The housing 30 of the drive assembly 20 has a main direction of extension which is positioned substantially perpendicularly to the longitudinal axis A and extends along the rotational axis B.

As mentioned above and as can be seen in FIGS. 3 and 5, the drive element 24 is arranged on the guide tube 12 such that it is secured against rotation. In this case, inwardly pointing projections 32 of the drive element 24 engage in corresponding longitudinal grooves 34 which extend on the outside of the guide tube 12 and in parallel with the longitudinal axis A.

The guide tube 12 is surrounded by a helical spring 36, the end of the helical spring 36 that is on the left-hand side in FIG. 1 being received in a first mount 38 and the end of the helical spring 36 that is on the right-hand side in FIG. 1 being received in a second mount 40.

Figure 2:
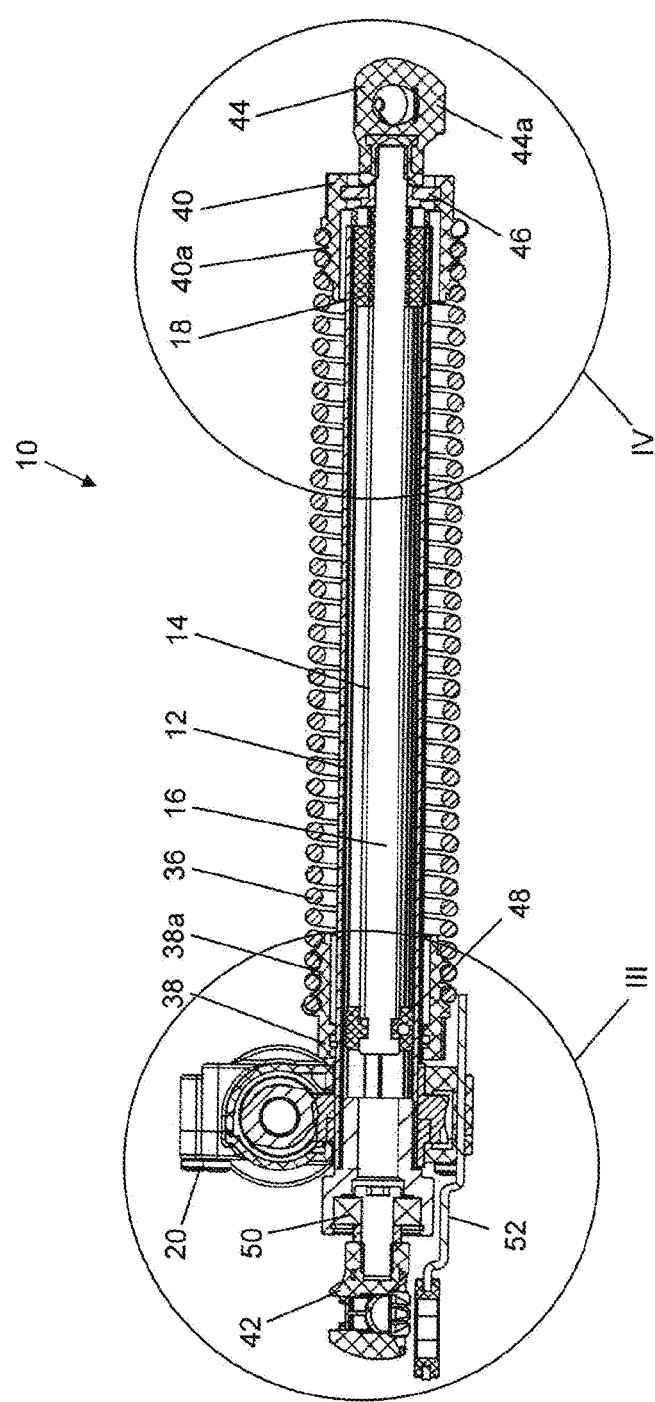
FIG. 2 is a side cross-sectional view of the spindle drive apparatus from FIG. 1 along the sectional plane II-II shown in FIG. 1.
Figure 3:
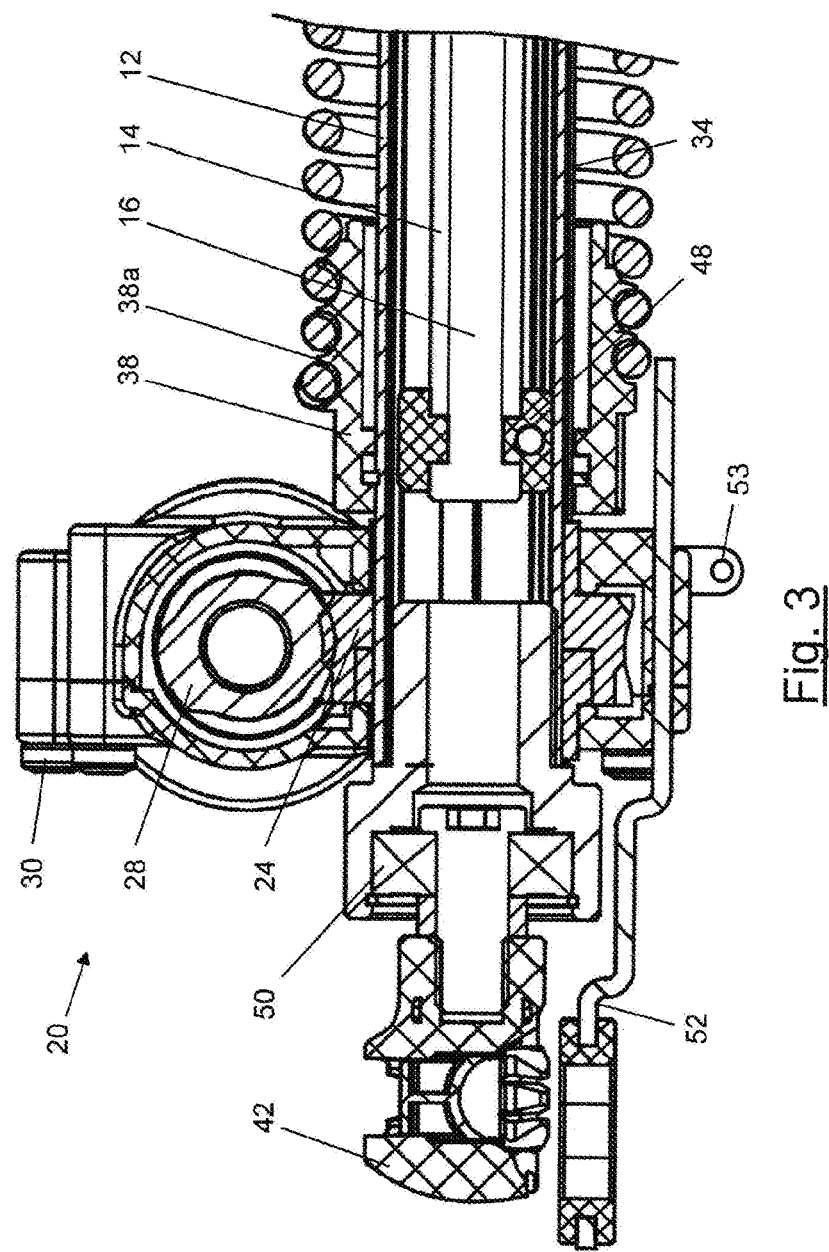
FIG. 3 is an enlarged view of the detail III from FIG. 2.
Figure 4:
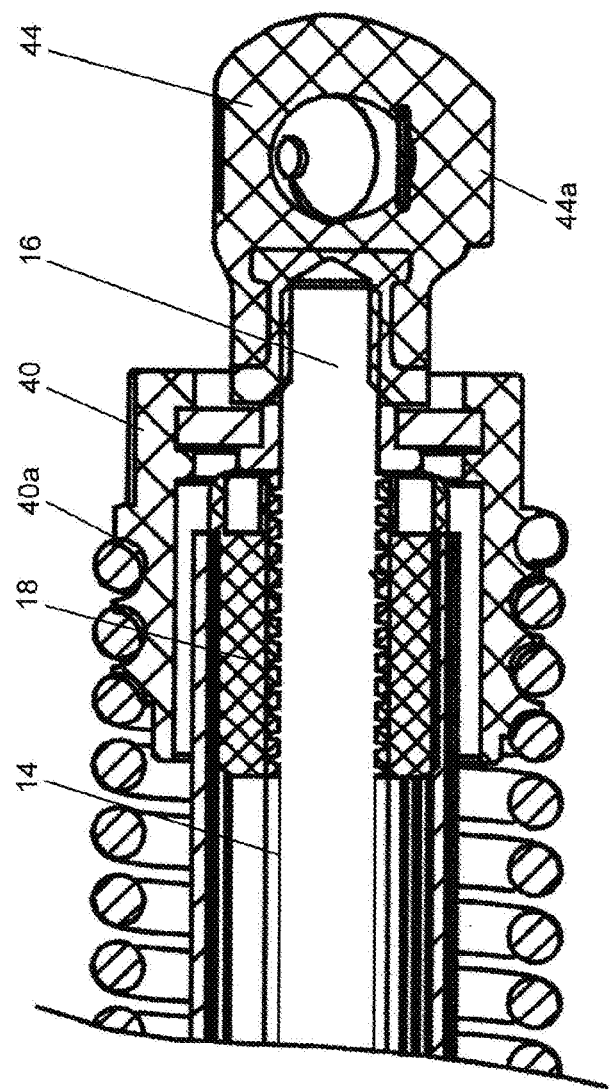
FIG. 4 is an enlarged view of the detail IV from FIG. 2.

With reference to FIGS. 2 to 4, it can be seen that the helical spring 36 is in threaded engagement 38a, 40a with both the first mount 38 and the second mount 40. In the embodiment of the spindle drive apparatus 10 shown in these figures, the first mount 38 is rigidly connected to the guide tube 12 for translation and rotation.

At each of the two ends along the longitudinal axis A, the spindle drive apparatus 10 comprises a connection unit 42 and 44, respectively, for connecting the spindle drive apparatus 10 to a superordinate assembly, i.e. an assembly that is not part of the spindle drive apparatus 10, such as a tailgate or a body of a vehicle.

The connection unit 44 is rotationally fixed to the end of the spindle 16 that protrudes out of the guide tube 12, the connection unit 44 being threaded onto the end of the spindle 16 in this case. The torque is supported by means of two shoulders 44a (see in particular FIG. 4) of the connection unit 44 on the associated ball pin (not shown) of the superordinate assembly. The second mount 40 is rotatably mounted on the spindle 16 adjacently to the connection unit 44 (see reference numeral 46).

A guide unit 48 is rigidly arranged on the end of the spindle 16 that is opposite the connection unit 44, which guide unit is slidably engaged with the interior wall of the guide tube 12 and thus reduces tilting of the spindle 16 relative to the guide tube 12 or even prevents said tilting from occurring in the first place. Alternatively, the guide unit 48 can also be connected to the interior wall of the guide tube 12 such that it cannot rotate, but can be moved axially, e.g. by means of engagement with corresponding longitudinal grooves in the interior wall of the guide tube 12 and projections on the guide unit 48, and can be in engagement with the spindle 16 such that it is free to rotate but is axially fixed, for example in sliding or rolling engagement.

At the end of the guide tube 12 that is opposite the connection unit 44, the connection unit 42 is connected to the guide tube 12 by means of a bearing 50 that allows rotation.

Owing to the rigid connection between the first mount 38 and the guide tube 12 and owing to the fact that the second mount 40 is mounted such that it can rotate relative to the connection unit 44, when the electric motor 22 is activated by means of the drive element 24, the guide tube 12 and thus the spindle nut 18 are rotated, and the helical spring 36 is rotated by means of the first mount 38, and therefore, by means of the threaded engagement between the spindle nut 18 and the spindle 16, the spindle 16 and thus the connection unit 44 are moved relative to the connection unit 42 along the longitudinal axis A, without the spindle 16 and the connection unit 44 rotating in the process.

Alternatively, it is conceivable for the first mount 38 to be mounted such that it can rotate relative to the guide tube 12, and for the second mount 40 to be rigidly connected to the connection unit 44 and/or the spindle 16, and therefore when the guide tube 12 rotates, the helical spring 36 does not rotate relative to the spindle 16.

Irrespective of whether or not the helical spring 36 is mounted such that it can rotate relative to the spindle 16, the helical spring 36 can simultaneously assume the function of an outer protective tube which can protect the components arranged inside the helical spring 36, such as the guide tube 12, from mechanical damage. The spindle drive apparatus 10 can however also comprise a protective sleeve on the outside of the helical spring 36.

In order to support the torque of the housing 30 of the drive assembly 20 and thus of the electric motor 22 relative to the guide tube 12, i.e. prevent undesired rotation of the drive assembly 20 relative to the connection unit 42 for example, a fastening element 52 is arranged on the drive assembly 20. In the embodiment shown here (see in particular FIGS. 2 and 3), the fastening element 52 engages with a mounting structure (not shown) of the superordinate assembly, which structure is also in engagement with the connection unit 42, e.g. by forming a ball joint. Of course, the fastening element 52 could also be directly connected to the connection unit 42.

In addition or as an alternative to the fastening element 52, a further fastening point 53 (see FIG. 3) could be provided on the housing 30, which further fastening point can at least contribute to the torque support of the housing 30.

As described above and as can be seen from the engagement between the drive element 24 and the guide tube 12 according to FIGS. 2, 3 and 5, it is possible for the drive assembly 20 to be moved on the guide tube 12 in parallel with the longitudinal axis A, and therefore the position of the drive assembly 20 relative to the two connection units 42 and 44 can be variably adjusted and the preloading of the helical spring 36 can optionally be modified. The drive assembly 20 can be fastened in the desired position relative to the guide tube 12 using a grub screw (not shown) for example, which connects the housing 30 of the drive assembly 20 to the fastening element 52, for example.

In this way, the fastening element 52 can also be moved relative to the drive assembly 20 and in parallel with the longitudinal axis A, or the fastening element 52 can be exchanged such that, for any position of the drive assembly 20, the fastening element 52 can be designed such that corresponding torque support is ensured.

Alternatively or additionally, the helical spring 36 can also be replaced by a helical spring that has a length and/or a spring force that differs from that of the helical spring 36.

The invention claimed is:

1. Spindle drive apparatus comprising
a guide tube having a longitudinal axis,
wherein the guide tube is provided, on one end thereof, with a connection unit for connecting the spindle drive apparatus to a superordinate assembly, which is an assembly that is not part of the spindle drive apparatus, and wherein the connection unit is fastened to the guide tube such that it can rotate relative thereto about the longitudinal axis,
a spindle which is provided with an external thread, is housed at least in part in the guide tube, and protrudes out of the guide tube at the other end thereof in each case,
wherein a further connection unit is rotationally fixed to the end of the spindle that protrudes out of the guide tube, which further connection unit is intended for connecting the spindle drive apparatus to a further superordinate assembly, which is an assembly that is not part of the spindle drive apparatus,
a spindle nut that is fastened to the guide tube and is in threaded engagement with the external thread of the spindle, and
a drive assembly comprising a drive unit,
wherein a drive element that is driven by the drive unit surrounds the guide tube and is rotationally fixable thereto, and
wherein the drive unit is supported on one of the superordinate assemblies or on an element connected thereto.

2. Spindle drive apparatus according to claim 1, wherein the drive element and the guide tube are rotationally fixed to one another via an interference fit.

3. Spindle drive apparatus according to claim 1, wherein the guide tube comprises, on the outside thereof, at least one groove extending in the axial direction.

4. Spindle drive apparatus according to claim 1, wherein the spindle drive apparatus also comprises a preloaded helical spring which surrounds the guide tube and the spindle over at least a portion of the length thereof in each case.

5. Spindle drive apparatus according to 1, wherein an output shaft of the drive unit extends substantially orthogonally to the spindle.

6. Spindle drive apparatus according to claim 5, wherein the output shaft of the drive unit supports a worm wheel which meshes with external teeth on the drive element connected to the guide tube.

7. Spindle drive apparatus according to claim 1, wherein the drive assembly can be connected to the guide tube in two positions in which it is rotated by 180° relative to an axis that extends orthogonally to the longitudinal axis.

8. Spindle drive apparatus according to claim 1, wherein the drive assembly comprises a housing in which the drive unit and the drive element are housed.

9. Spindle drive apparatus according to claim 8, wherein the housing has two housing parts which are optionally asymmetric to one another.

10. Spindle drive apparatus according to claim 1, wherein a guide unit is arranged on the end of the spindle that is housed in the guide tube, which guide unit is slidably engaged with the interior wall of the guide tube.

\* \* \* \* \*